C. L. SEELEY.
LOCKING DEVICE.
APPLICATION FILED MAY 13, 1911.
1,020,930.
Patented Mar. 19, 1912.
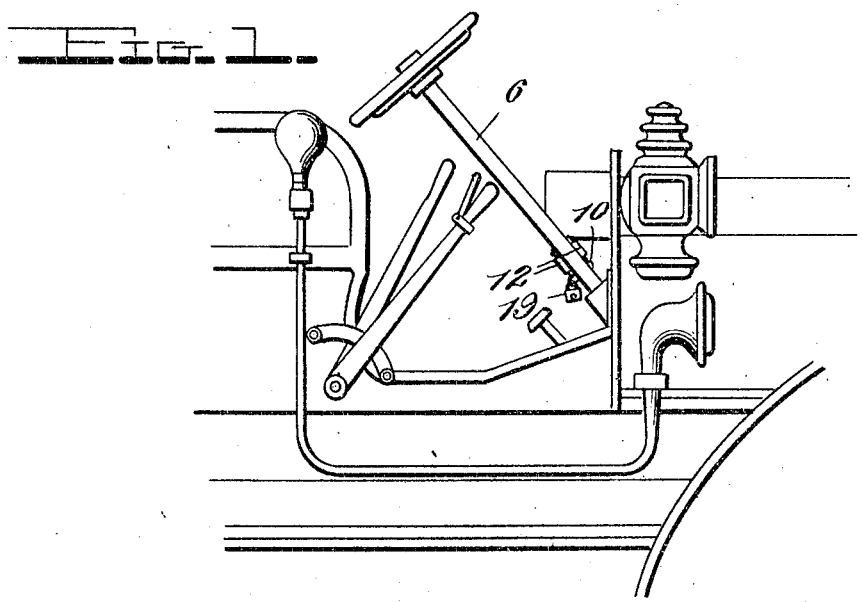
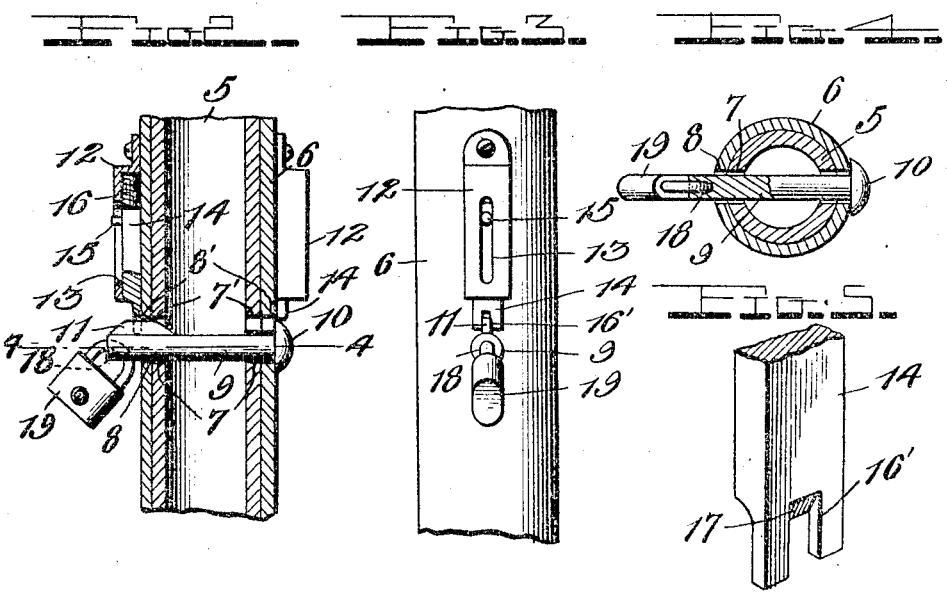
Witnesses
Chas. L. Griesbauer.
L. G. Ellis.
Inventor
Charles L. Seeley,
By Watson E. Coleman,
Attorney

UNITED STATES PATENT OFFICE.

CHARLES L. SEELEY, OF LA JUNTA, COLORADO.

LOCKING DEVICE.

1,020,930.  Specification of Letters Patent.  Patented Mar. 19, 1912.

Application filed May 13, 1911. Serial No. 627,047.

*To all whom it may concern:*

Be it known that I, CHARLES L. SEELEY, a citizen of the United States, residing at La Junta, in the county of Otero and State of Colorado, have invented certain new and useful Improvements in Locking Devices, of which the following is a specification, reference being had to the accompanying drawings.

This invention relates to improvements in locking devices and more particularly to a device for locking the steering post of a motor vehicle whereby tampering with the machine by unauthorized parties during the absence of the owner is rendered impossible.

The primary object of the present invention is to provide a very simple and effective lock which may be easily and quickly operated and will securely retain the wheels of a motor vehicle in the position to which they have been turned.

A further object of the invention is to provide a bolt transversely disposed through the steering post, means mounted on the steering post co-acting with said bolt to prevent rotative movement of the bolt, said means also closing the openings through which the bolt is positioned, when said bolt is removed.

A still further object of the invention is to provide a locking bolt adapted to be inserted through a steering post and its casing, a spring pressed plate slidably mounted upon the casing of the post and normally closing the bolt receiving openings, said bolt having means thereon to move said plate and co-act with the plate to prevent rotative movement of the bolt, and a padlock removably attached to one end of the bolt to prevent its extraction.

With the above and other objects in view, the invention consists of the novel features of construction, combination and arrangement of parts hereinafter fully described and claimed, and illustrated in the accompanying drawings, in which—

Figure 1 is a side elevation of a portion of a motor vehicle showing my improved locking device applied to the steering post thereof; Fig. 2 is an enlarged longitudinal section through the post; Fig. 3 is a detail elevation showing the normal position of the spring pressed plate; Fig. 4 is a section taken on the line 4—4 of Fig. 2; and Fig. 5 is a detail perspective view of the spring pressed plate.

Referring in detail to the drawing 5 designates the tubular steering post of an automobile and 6 the casing therefor. The post and casing are provided with openings 7 and 8 respectively which, when the post is locked, are disposed in alinement to receive the locking bolt 9. This bolt is provided upon one end with a head 10 and upon the other end thereof a longitudinally extending inverted V-shaped rib or web 11 is formed. The steering post and its casing are also provided with short longitudinal slots 7', 8' respectively which communicate with the openings 7 and 8 and are adapted to receive this longitudinal rib of the locking bolt. Upon opposite sides of the casing 6, a housing 12 is rigidly secured. This housing is rectangular in form, and the outer wall thereof is provided with a longitudinal slot 13. The periphery of the casing 6 forms the other wall of the housing and between said walls the vertically sliding plate 14 is arranged, said plate having a stud 15 formed on one end projecting into the slot 13 of the housing. A coiled spring 16 is also arranged in said housing and engages upon one end of the plate to force said plate downwardly below the lower end of the housing and normally dispose the same over the opening 8 in the casing, thereby excluding dust and other foreign matter from the interior of said casing. This position of the spring pressed plate is illustrated in Fig. 3 of the drawing and it will be noted that the lower end of the sliding plate is provided with a short longitudinal recess 16', the upper edge of which is downwardly and outwardly beveled as indicated at 17 for engagement by the inclined edges of the rib 11 on the locking bolt. It will therefore be seen that when the bolt 9 is inserted through the post, one of the plates 14 is first lifted, and the end of the bolt having the rib formed thereon inserted through the alined openings 7 and 8 of the post and its casing. The plate on the opposite side of the casing is also lifted so that the rib 11 is received in the recess 16' of said plate, and as the bolt is moved through the alined openings of the post and its casing, the engagement of the rib 11 with the inclined edge 17 of said recess lifts the plate 14 until the lower end of the plate is disposed upon opposite sides of the central portion of said rib. When in this position it will be obvious that any turning movement of the bolt is prevented, thus practically eliminating all wear upon the post. The end of the bolt on which the rib 11 is formed is further provided with a curved orifice 18, the ends of which open through the end of the bolt and through one side thereof. This orifice is adapted to receive the shackle of a padlock 19 of any preferred form, whereby said bolt is securely locked in position in the post and its extraction prevented. By disposing the shackle of the padlock through the end of the bolt in this manner, said shackle engages with the tubular casing 6 of the post and any longitudinal movement of the bolt 9 is also prevented. It will be understood that the studs 15 on the plates 14 project from the slot 13 of the housing so that they may be readily engaged by the finger of the operator to lift the plates.

By providing the vertically movable spring pressed plates 14 on opposite sides of the steering post casing, the locking bolt 9 may be inserted from either side of the post through the openings 7 and 8. It is of course understood that only one of the locking plates 14 engages with the web 11 on the bolt 9 at a time, the plate 14 on the opposite side of the post serving simply to cover the opening in the post casing when the bolt 9 is removed. This is the principal reason for the provision of the two vertically movable plates 14. These plates and the housings 12 in which they are arranged are identical in construction.

From the foregoing it is believed that the construction and operation of my improved locking device will be fully understood. The same is very simple, may be easily and quickly arranged in position on the steering post and effectually prevents any turning movement of said post so that unauthorized tampering with the machine in the absence of the owner is prevented. My improved lock may also be manufactured at a comparatively small cost, and is extremely durable and highly efficient in practical use.

While I have disclosed the invention as applied to the steering post of a motor vehicle, the device is also applicable to many other uses, and it will therefore be understood that I do not wish to be restricted to the specific use herein set forth. The device is further susceptible of a great many minor modifications in the form, proportion and arrangement of the parts without departing from the essential feature or sacrificing any of the advantages thereof.

Having thus described the invention what is claimed is:—

1. In a lock of the character described, the combination with a steering post and its casing having openings therein at diametrically opposite points, of a locking pin adapted to be inserted through said openings, and means movably mounted on the post casing adapted to coact with means formed on the pin to prevent rotative movement of the pin in the post.

2. In a lock of the character described, the combination with a steering post and its casing having openings therein at diametrically opposite points, of a locking pin adapted to be inserted through said openings, spring pressed plates longitudinally movable on the post casing, said pin carrying means co-acting with said plates to prevent rotative movement of the pin in the post.

3. In a lock of the character described, the combination with a steering post and its casing having openings therein at diametrically opposite points, of a locking pin adapted to be inserted through said openings, a plate slidable upon the casing of the post co-acting with said pin to hold the same against rotative movement, and additional means removably engaged with one end of said pin and co-acting with the casing of the post to prevent longitudinal movement of the pin.

4. In a lock of the character described, the combination with a steering post and its casing having openings therein at diametrically opposite points, of a locking pin having a head on one end adapted to be inserted through said openings, spring pressed plates slidably mounted on the casing of the post, said pin having a longitudinal rib formed thereon to be engaged by said plates to prevent rotative movement of the pin in the post, and a padlock removably engaged in the end of said pin and co-acting with the post casing to prevent longitudinal movement of the pin.

5. In a lock of the character described, the combination with a steering post and its casing having openings therein at diametrically opposite points, of a locking pin having a head on one end and adapted to be inserted through said openings, said pin having a rib formed on its other end, spring pressed plates arranged on the post casing normally covering the openings thereof adapted to be engaged by said rib to prevent rotative movement of the pin, and means removably engaged with said pin and co-acting with the post casing to prevent longitudinal movement of the pin.

6. In a lock of the character described, the combination with a steering post and its casing having openings therein at diametrically opposite points, of a locking pin adapted to be inserted through said openings, said pin having a head formed on one end and a longitudinally extending inverted V-shaped rib on its other end, spring pressed plates arranged on said casing and normally closing the openings therein, a recess in one end of said plates to receive the rib on said pin, one of said plates co-acting with said rib in the locking position of the pin to prevent said pin from rotating, said pin having a curved orifice therein opening through one end and upon the side of the pin, and a padlock having its shackle removably engaged in said orifice and co-acting with the casing of the post to prevent longitudinal movement of the pin.

In testimony whereof I hereunto affix my signature in the presence of two witnesses.

CHARLES L. SEELEY.

Witnesses:
 GEO. E. McCAULEY,
 CHARLES P. MILLER.